United States Patent
Jones, Jr. et al.

(10) Patent No.: US 11,618,981 B2
(45) Date of Patent: Apr. 4, 2023

(54) NYLON FLOORCOVERINGS EMPLOYING VAT DYESTUFFS AND METHODS OF MAKING THE SAME

(71) Applicant: Wilana Chemical LLC, Rome, GA (US)

(72) Inventors: Dennis J. Jones, Jr., Signal Mountain, TN (US); Ralph R. Sargent, Rome, GA (US)

(73) Assignee: WILANA CHEMICAL LLC, Rome, GA (US)

( * ) Notice: Subject to any disclaimer, the term of this patent is extended or adjusted under 35 U.S.C. 154(b) by 809 days.

(21) Appl. No.: 16/322,702

(22) PCT Filed: Aug. 1, 2017

(86) PCT No.: PCT/US2017/044897
§ 371 (c)(1),
(2) Date: Feb. 1, 2019

(87) PCT Pub. No.: WO2018/026813
PCT Pub. Date: Feb. 8, 2018

(65) Prior Publication Data
US 2021/0348331 A1 Nov. 11, 2021

Related U.S. Application Data

(60) Provisional application No. 62/369,524, filed on Aug. 1, 2016.

(51) Int. Cl.

| | |
|---|---|
| *D02G 3/04* | (2006.01) |
| *C09B 67/00* | (2006.01) |
| *D02G 3/22* | (2006.01) |
| *D02G 3/44* | (2006.01) |
| *D06P 3/00* | (2006.01) |
| *D06N 7/00* | (2006.01) |
| *D06P 3/24* | (2006.01) |
| *C09B 67/06* | (2006.01) |
| *C09B 67/14* | (2006.01) |

(52) U.S. Cl.
CPC ........... *D02G 3/04* (2013.01); *C09B 67/0003* (2013.01); *D02G 3/22* (2013.01); *D02G 3/44* (2013.01); *D06N 7/0065* (2013.01); *D06P 3/00* (2013.01); *D06P 3/243* (2013.01); *C09B 67/0017* (2013.01); *D06N 2201/0263* (2013.01); *D06N 2209/0807* (2013.01); *D06N 2209/0823* (2013.01)

(58) Field of Classification Search
CPC .............. D02G 3/04; D02G 3/22; D02G 3/44; C09B 67/0003; C09B 67/0017; D06N 7/0065; D06N 2201/0263; D06N 2209/0823; D06P 3/00; D06P 3/243
See application file for complete search history.

(56) References Cited

U.S. PATENT DOCUMENTS

| | | | |
|---|---|---|---|
| 2,368,940 A | 2/1945 | Miller | |
| 3,127,231 A * | 3/1964 | Neale | D06P 1/221 8/102 |
| 3,822,996 A * | 7/1974 | Lofquist | D06P 3/26 8/585 |
| 3,989,455 A | 11/1976 | Lofquist et al. | |
| 3,999,940 A * | 12/1976 | Freeman | D06N 7/0065 428/96 |
| 4,132,522 A | 1/1979 | Fono et al. | |
| 4,273,720 A | 6/1981 | Wald | |
| 4,286,955 A | 9/1981 | Lewis | |
| 5,558,677 A * | 9/1996 | Wagenmann | D06P 1/221 8/918 |
| 5,607,483 A * | 3/1997 | Burkinshaw | D06P 1/221 8/650 |
| 5,904,738 A | 5/1999 | Purcell | |
| 6,129,769 A * | 10/2000 | Xu | D06P 1/222 8/651 |
| 2005/0097685 A1* | 5/2005 | Seuthe | D06P 3/6025 8/518 |
| 2005/0183218 A1* | 8/2005 | Rao | D01F 1/04 8/115.51 |
| 2018/0313006 A1* | 11/2018 | Stanhope | D02G 3/443 |
| 2019/0292694 A1* | 9/2019 | Jones, Jr. | D02G 3/22 |

OTHER PUBLICATIONS

Baig, G.A. Dyeing Nylon With Indigo in Various Ph Regions. Autex Research Journal, vol. 10, No. 1, Mar. 2010 p. 21-25.*
International Search Report and Written Opinion corresponding to PCT/US2017/044897, dated Oct. 18, 2017, 9 pages.

* cited by examiner

*Primary Examiner* — Amina S Khan
(74) *Attorney, Agent, or Firm* — J. Clinton Wimbish; Nexsen Pruet, PLLC

(57) ABSTRACT

In one aspect, floor coverings are described herein comprising nylon fibers dyed with at least one vat dyestuff, the dyed nylon fibers exhibiting enhancements to lightfastness, color fastness, wet fastness and/or resistance to household bleach.

15 Claims, No Drawings

NYLON FLOORCOVERINGS EMPLOYING VAT DYESTUFFS AND METHODS OF MAKING THE SAME

CROSS REFERENCE TO RELATED APPLICATIONS

This application is a U.S. National Phase of PCT/US2017/044897, filed Aug. 1, 2017, which claims priority pursuant to 35 U.S.C. § 119(e) to U.S. Provisional Patent Application Ser. No. 62/369,524 filed on Aug. 1, 2016, each of which is hereby incorporated by reference in its entirety.

FIELD

The present invention relates to dyed textile compositions and, in particular, to floor coverings comprising nylon fibers dyed with one or more vat dyestuffs.

BACKGROUND

Current processes for producing colored nylon floor coverings, such as carpets, have several disadvantages. Acid dyes, for example, are commonly employed for coloration of nylon fibers used in carpet yarns due to the ease with which anionic nylon polymer accepts the dye. This ease of dyeing, however, also facilitates staining if the nylon fibers are exposed to dyestuff-like contaminants during use. Moreover, acid dyes are commonly applied to nylon fibers in batch or continuous processes. Under this approach, a risk exists of ozone fading if the material is installed in a tropical environment. Treatments have been developed to improve resistance of acid dyed nylon to ozone fading. These treatments include novolak resins, acrylic polymers, tannic acid or various combinations thereof. Such treatments, nevertheless, can alter shades of the dyed fiber and/or induce a reduction in lightfastness of the dyed fibers. Additionally, these treatments increase floor covering costs and introduce various complexities in the manufacturing process.

In view of these disadvantages, metal complex dyes can be applied to nylon fibers. Metal complex dyes offered enhanced ozone fastness compared to acid dyes but do not translate well to solid shade, continuous processes. Metal complex dyes can also present environmental risks due to potential toxicity associated with the metal centers.

SUMMARY

In view of these disadvantages, alternative dyeing compositions and techniques are provided for nylon floor coverings. In one aspect, a floor covering described herein comprises nylon fibers dyed with at least one vat dyestuff, the dyed nylon fibers exhibiting a lightfastness rating of at least 4 according to the American Association of Textile Chemists and Colorists (AATCC) Test Method 16, Option 3. In some embodiments, the dyed nylon fibers exhibit a color fastness to ozone rating of at least 4 after 5 exposure cycles according to AATCC 129. The nylon fibers dyed with the vat dyestuff may also exhibit a wet fastness gray scale rating of at least 4/5 for transfer to an undyed control. In further embodiments, the dyed nylon fibers exhibit a gray scale rating of at least 4/5 after 24 hours exposure to household bleach.

In another aspect, methods of making dyed nylon floor coverings are described herein. In some embodiments, a method of making a floor covering comprises providing nylon fibers and contacting the nylon fibers with a dyeing composition comprising a vat dyestuff in reduced form. The vat dyestuff applied to the nylon fibers is subsequently oxidized by drying the nylon fibers in air. In some embodiments, the air is heated to a temperature in excess of 200° F. The resulting dyed nylon fibers can exhibit lightfastness, color fastness, wet fastness and/or resistance to household bleach as described above.

These and other embodiments are further described in the following detailed description.

DETAILED DESCRIPTION

Embodiments described herein can be understood more readily by reference to the following detailed description, examples, and drawings. Elements, apparatus, and methods described herein, however, are not limited to the specific embodiments presented in the detailed description, examples, and drawings. It should be recognized that these embodiments are merely illustrative of the principles of the present invention. Numerous modifications and adaptations will be readily apparent to those of skill in the art without departing from the spirit and scope of the invention.

In one aspect, floor coverings comprising nylon fibers dyed with one or more vat dyestuffs are provided. As detailed further herein, these dyed nylon floor coverings exhibit enhanced lightfastness, wet fastness, color fastness to ozone and/or resistance to household bleach. For example, the nylon fibers dyed with one or more vat dyestuffs can meet one or more criteria set forth in Table I.

TABLE I

Properties of Dyed Nylon Fibers

| Property | Test | Grayscale (GS) Rating |
|---|---|---|
| Lightfastness | AATCC Test Method 16, Option 3 | 3-5 |
| Color Fastness to Ozone | AATCC 129 | 4-5 |
| Wet Fastness | Transfer to undyed control | 4-5 |
| Household Bleach Resistance | Application of household bleach (24 hrs) | 4-5 |

Dyed nylon fibers of floor coverings described herein can be cationic. Cationic nylon fibers include nylon-6 and nylon-6,6. In other embodiments, the dyed nylon-6 and/or nylon-6,6 fibers are not cationic. In some embodiments, the dyed nylon fibers faun a tufted pile or loop pile in carpet applications.

Any vat dyestuff not inconsistent with the objectives of the present invention can be applied to nylon fibers of the floor coverings. Suitable vat dyestuffs generally contain two or more ketone groups separated by a system of conjugated bonds. In some embodiments, vat dyestuffs include indigo and derivatives thereof. Vat dyestuffs may also include various derivatives of anthroquinones. Table II provides a non-limiting list of vat dyes for use with nylon fibers according to some embodiments described herein.

TABLE II

Vat Dyestuffs for Nylon Fiber Dyeing

Vat Yellow 33
Vat Green 13
Vat Brown 1
Vat Brown 3
Vat Blue 6

TABLE II-continued

Vat Dyestuffs for Nylon Fiber Dyeing

Vat Black 22
Vat Black 25
Vat Black 27
Vat Yellow 4
Vat Green 1

In another aspect, methods of making dyed nylon floor coverings are described herein. In some embodiments, a method of making a floor covering comprises providing nylon fibers and contacting the nylon fibers with a dyeing composition comprising a vat dyestuff in reduced form. The vat dyestuff applied to the nylon fibers is subsequently oxidized by drying the nylon fibers in air. In some embodiments, the air is heated to a temperature in excess of 200° F. The resulting dyed nylon fibers can exhibit lightfastness, color fastness, wet fastness and/or resistance to household bleach as set forth in Table I.

The dyeing composition can include one or more vat dyestuffs in any amount not inconsistent with the objectives of the present invention. In some embodiments, vat dyestuff is present in the dyeing composition at an add-on level of at least 0.1% on weight fiber. Vat dyestuff can also be present in the dyeing composition at add-on levels according to Table III.

TABLE III

| Amount Dyestuff(s) (owf) |
|---|
| ≥0.25 |
| ≥0.5 |
| >1 |
| 0.1-1 |
| 0.25-1 |

The dyeing composition including one or more vat dyestuffs can be prepared according to several techniques. In some embodiments, an aqueous dispersion of one or more vat dyestuffs is initially provided. Purified water free or substantially free of hardening species such as calcium and magnesium can be used as the dispersion continuous phase. Alternatively, one or more water softening agents can be added to the dispersion to sequester hardening species. Such purified or treated water is generally referred to as soft water herein. Vat dyestuff(s) are added to the continuous aqueous phase in amounts consistent with the add-on levels provided in Table III. The continuous aqueous phase may be heated to a temperature of 30-35° C. and mixing may be employed to assist in dispersion of the vat dyestuff(s).

A reducing system is prepared for combination with the aqueous dispersion of the vat dyestuff(s). In some embodiments, a reducing system comprises one or more chemical species for reducing the vat dyestuff(s), thereby placing the dyestuff(s) in the water soluble form. Reduction of the vat dyestuff(s) may convert the dyestuff(s) to leuco Bolin, in some embodiments. Any suitable reductant species not inconsistent with the objectives of the present invention can be employed. Sodium dithionate, for example, can be a reductant for one or more vat dyestuffs. In some embodiments, ferrous sulfate can be used in conjunction with sodium dithionate for dyestuff reduction. The reducing agent can be added to soft water to provide the reducing system. In some embodiments, the water is heated to a temperature of 30-35° C., and the one or more reductants are added with mixing or other mechanical agitation. Amounts of reducing agent added to the soft water can be sufficient to reduce all or substantially all of the vat dyestuffs employed in the dyeing process. Once dispersion and wetting of the reducing system has been achieved, it can be added to the exhaust dyeing equipment containing the dispersed form of the vat dyes and an initial water charge. In some embodiments, a reducing system is not necessary as the vat dyestuffs are provided in reduced form from the manufacturer. For example, a solution of reduced vat dyestuff can be commercially available and used in accordance with methods described herein.

One or more alkaline species for adjusting the pH of the dyeing composition is dispersed in soft water. Caustic soda (NaOH) or aqua ammonia, for example, can be employed as an alkaline pH adjusting agent. Other pH adjusting agents are well-known in the art and may also be used. Once produced, the pH adjusting composition is added to the exhaust dye equipment. In a further step of the dyeing composition, dispersing agent(s) and/or leveling agent(s) are added. Polyvinylpyrrolidone, for example, can serve as a dispersing agent for the vat dyestuffs as well as a providing some retarding and leveling action. Moreover, if carrier is found to be useful for a given formulation, benzyl alcohol can be used. Additionally, many options exist for dispersing agents, leveling agents, carriers and/or swelling agents that may be useful for nylon fiber dyeing compositions. Table IV provides amounts of reducing and pH adjustment agents for dyeing compositions having various dyestuff concentrations (owf) for application by exhaust dyeing systems.

TABLE IV

Reducing and pH Adjustment Agents

| Dyestuff Concentration (owf) | Sodium Dithionate (g/l) | Caustic Soda 50% (g/l) |
|---|---|---|
| 0.1% | 2-3 | 2.5-3.5 |
| 0.11-1.0% | 2-3 | 4-5 |
| >1.0% | 3-4 | 5-7 |

Table V provides amounts of reducing and pH adjustment agents for dyeing compositions having various dyestuff concentrations (owf) for application by a continuous dyeing system at 450% wet pick up.

TABLE V

Reducing and pH Adjustment Agents

| Dyestuff Concentration (owf) | Sodium Dithionate (g/l) | Caustic Soda 50% (g/l) |
|---|---|---|
| 0.1% | 4-5 | 9-10 |
| 0.11-1.0% | 5-7 | 14-16 |
| >1.0% | 6-8 | 17-20 |

Table VI provides amounts of reducing and pH adjustment agents for dyeing compositions having various dyestuff concentrations (owf) for application by continuous space dyeing at 100% wet pick up.

TABLE VI

| Reducing and pH Adjustment Agents | | |
| --- | --- | --- |
| Dyestuff Concentration (owf) | Sodium Dithionate (g/l) | Caustic Soda 50% (g/l) |
| 0.1% | 18-22 | 28-32 |
| 0.11-1.0% | 23-27 | 33-37 |
| >1.0% | 28-32 | 38-42 |

Additionally, Table VII provides various liquor ratios (LR) for exhaust dyeing, continuous dyeing and continuous space dyeing processes according to some embodiments.

TABLE VII

| Liquor Ratios | |
| --- | --- |
| Dyeing Process | Liquor Ratio |
| Exhaust | 25:1 |
| Continuous | 4.5:1 |
| Continuous Space | 1:1 |

With reference to application by exhaust dyeing equipment, initial mixing and wetting out of the nylon fiber, yarn or greige by thxxe dyeing composition can be allowed to occur over a time period of at least 15 minutes at a temperature of 30-35° C. A temperature ramp is subsequently administered. In some embodiments, temperature is ramped at 1.5° C./min to an 80° C. hold for 45 minutes. Once the dyeing cycle is complete, the bath can be overflowed for initial cooling followed by draining off the spent dyebath from the exhaust dyeing apparatus. A rinse bath of ambient water is then provided, and the dyed nylon fibers are circulated through the bath for a minimum of 15 minutes to remove any unfixed material from the fiber surfaces. Depending on dyeing composition, it may be helpful to add an organic acid component, such as acetic acid, to assist in unfixed material removal and to lower pH of the nylon fibers. In some embodiments, 30-80 percent dyestuff exhaustion is achieved.

After rinsing, the dyed nylon fibers are removed from the exhaust dyeing apparatus and extracted to mechanically remove as much water as possible, without fiber damage. The extracted fibers are then subjected to air drying. Air drying can occur at ambient temperature or elevated temperatures. In some embodiments, for example, air drying occurs at temperatures of 200-300° F., such as 240-260° F. Drying is continued until a moisture content of 5% or less is achieved. The drying process also serves as an oxidation step for the vat dyestuffs on the nylon fibers. This drying and oxidation fixes the vat dyestuffs on the nylon fibers, greatly improving their fastness properties listed in Table I herein. Dyestuff oxidation and fixing during the heating process fundamentally differs from prior processes where one or more oxidizing agents are employed for vat dyestuff oxidation. For example, prior processes can use peroxide and/or other oxidants for dyestuff oxidation. The present method surprisingly oxidizes and fixes the vat dyestuffs in the absence of such oxidizing species, thereby simplifying the dyeing process.

For continuous dyeing processes, the main difference with exhaustion processes is the separation of the vat dyestuff dispersion from the reducing system until just prior to application of the dyeing composition to the nylon fibers. For example, a bath containing the pre-dispersed vat dyestuff(s) can be held in Tank A while Tank B contains the reducing system, pH adjustment agent(s) and other auxiliary materials such as wetting agents, leveling agents, carriers and the like. The contents of Tanks A and B are metered and mixed together in appropriate ratio to provide the dyeing composition. The dyeing composition is then applied to the nylon yarn or carpet greige being processed continuously through either a space dye line (in the case of yarn) or a continuous broad loom dye range (in the case of nylon carpet greige). After the two baths are combined and applied, the fiber can be exposed to heat to promote exhaustion of the vat dyestuff(s) on the fibers. Generally, saturated steam can be used as the heat source. After the heating cycle, the dyed fibers can be rinsed, extracted and dried as described above. The drying process oxidizes the vat dyestuff(s).

These and other embodiments are further illustrated by the following non-limiting examples.

EXAMPLE 1—CATIONIC NYLON FIBERS DYED WITH VAT DYESTUFFS

Cationic nylon fibers were dyed with vat dyestuffs listed in Table VIII. An Ahiba Texomat machine was used to process 25:1 liquor ratio (LR) dyeings using the vat dyestuffs of Table VIII. For each dyeing, the vat dyestuff was weighed using a four place balance. Versene 100 (EDTA), sodium dithionate (hydrosulfite) and caustic soda (NaOH) 50% were then added, in total, to the container with the dyestuff powder and 50 ml of water. The dyestuff/chemical concentrate was heated to 85° C. using a microwave oven. The heated mixture was then added to an empty Ahiba tube, set at 40° C. and allowed to stand for 20 minutes to complete the vatting step. Tap water was then added to achieve the desired 800 ml volume for dyeing. A 32 gram sample of nylon-6,6 cationic greige was then added to the Ahiba tube. The dyeing cycle was started, heating to 90° C. at 2 C/min and holding at 90° C. for 30 minutes (NaCl added at 75° C.). The dyed greige was then removed and rinsed with a 1 g/l acetic acid solution at 25:1 LR, then rinsed under running tap water, followed by centrifuge for extraction and drying at 230° F. for 15 minutes.

TABLE VIII

| Vat Dyestuffs |
| --- |
| Vat Yellow 33 |
| Vat Black 22 |
| Vat Black 25 |
| Vat Green 13 |
| Vat Brown 1 |
| Vat Yellow 4 |

The cationic nylon fibers dyed with the vat dyes were tested for lightfastness according to AATCC Test Method 16, Option 3. Results of the lightfastness testing are provided in Table IX.

TABLE IX

| Vat Dyestuffs | |
| --- | --- |
| Dyestuff | AATCC 16, Opt. 3 GS Rating |
| Vat Yellow 33 | 4.5 |
| Vat Black 22 | 3 |
| Vat Black 25 | 3 |
| Vat Green 13 | 3 |

TABLE IX-continued

| Vat Dyestuffs | |
|---|---|
| Dyestuff | AATCC 16, Opt. 3 GS Rating |
| Vat Brown 1 | 3 |
| Vat Yellow 4 | 3 |

As provided in Table IX, the dyed cationic nylon fibers exhibited acceptable lightfastness.

EXAMPLE 2—WETFASTNESS OF DYED CATIONIC NYLON

Each of the dyes listed in Table X were used to provide samples of dyed cationic nylon fiber for wet fastness testing. In the wet fastness test, a 5 gram sample of the dyed material was exposed to the sample dyebath, along with 2.5 g portions of undyed nylon-6,6 greige, and 2.5 g of undyed nylon 6 greige. Wetting and leveling agents were also included in the dyebath (1% owf of TAM 20 and 1% owf of DOSS 70, based on total greige weight of 10 grams in each dyebath for migration testing). The dyed and undyed greige samples, chemicals and water were added to an Ahiba tube to achieve a LR of 40:1. The contents of the tube were heated to 95° C. and held for 30 minutes. After the dyeing cycle, the contents of each tube were removed, extracted, dried and allowed to condition prior to gray scale rating of the color change for each sample. Table X also summarizes the results of the wet fastness testing.

TABLE X

| Wet Fastness Testing Results | | | |
|---|---|---|---|
| Color Change | After migration Dyed initial N66 Cat | After Migration Undyed N66 Cat | After Migration Undyed N6 Acid |
| AH19-A Metal Comp | | | |
| Dyed initial N66 Cat | 3 GS, color loss | | |
| Undyed N66 Cat | | 3/4 GS, staining | |
| Undyed N6 Acid | | | 1.5 GS, staining |
| AH19-B Level Acid | | | |
| Dyed initial N66 Cat | 1 GS, severe color loss | | |
| Undyed N66 Cat | | 3 GS, staining | |
| Undyed N6 Acid | | | 1 GS, severe staining |
| AH19-H Cationic dyes | | | |
| Dyed initial N66 Cat | 3/4 GS. Color loss | | |
| Undyed N66 Cat | | 2 GS, staining | |
| Undyed N6 Acid | | | 3/4 GS, staining |
| AH19-G Vat dyes | | | |
| Dyed initial N66 Cat | 4/5 GS, color loss | | |
| Undyed N66 Cat | | 4/5 GS | |
| Undyed N6 Acid | | | 4 GS |

A review of the staining and color transfer indicates that the sample dyed with vat dyestuff is significantly superior to the other samples with regard to wet fastness of the dyed material.

EXAMPLE 3—TENSILE STRENGTH OF DYED NYLON FIBERS

Experiments were conducted to determine the effect of the vat dyeing procedures described herein on tensile strength retention of the nylon-6,6 cationic fibers. A twisted heatset sample of nylon-6,6 yarn was exposed to the dyeing system as set forth in Example 1 above. A control was also processed using the same nylon-6,6 yarn and same dyeing conditions, the difference being that only water was used as the exposure medium for the dyeing. Table XI summarizes the results of the tensile strength testing.

TABLE XI

| Tensile Strength Testing Results | | | | |
|---|---|---|---|---|
| A % owf | Chemical formulation - 0.25% owf primary | | | Vat Brown 1 grams - .8 lt |
| 2.5 | Versene 100 | 1 | g/l | 0.8 |
| 5.75 | Hydrosulfite | 2.3 | g/l | 1.84 |
| 7.5 | Caustic 50% | 3 | g/l | 2.4 |
| 5 | NaCl | 2 | g/l | 1.6 |
| | | | mls = | 25 |
| | Rinse with 1 g/l Acetic Acid solution, followed by warm water Centrifuge, then dry at 230 F. for 20 minutes ASTM D2256 Tensile strength retention = 84.2% @ 200 hrs xenon exposure | | | |
| B | Water Only Same Ahiba cycle as indicated above Rinse with water only, centrifuge, dry at 230 F. for 20 min ASTM D2256 Tensile strength retention = 98.7% @ 200 hrs xenon exposure | | | |

The results of the testing indicate that the nylon-6,6 twisted, heatset yarn retains 84.2% of the original tensile strength, compared with 98.7% strength retention for the water only control using the same yarn and heating profile. The 84.2% strength retention after 200 hours of xenon exposure is desirable for both residential and contract use.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A method of making a floor covering comprising:
   providing nylon fibers;
   contacting the nylon fibers with a dyeing composition comprising at least one vat dyestuff in reduced form; and
   oxidizing the vat dyestuff applied to the nylon fibers by drying the nylon fibers in air at an elevated temperature, wherein the drying is done until a moisture content of the nylon fibers of 5% or less is achieved.

2. The method of claim 1, wherein the air has a temperature of 200-300° F.

3. The method of claim 1, wherein the dyed nylon fibers exhibit a lightfastness rating of at least 4 according to AATCC Test Method 16, Option 3.

4. The method of claim 1, wherein the dyed nylon fibers exhibit a color fastness to ozone rating of at least 4 after 5 exposure cycles according to AATCC 129.

5. The method of claim 1, wherein the dyed nylon fibers exhibit a wet fastness gray scale rating of at least 4/5 for transfer to an undyed control.

6. The method of claim 5, wherein the dyed nylon fibers exhibit a gray scale rating of at least 4/5 after 24 hours exposure to household bleach.

7. The method of claim 1, wherein the nylon fibers comprise cationic nylon.

8. The method of claim 1, wherein the nylon fibers are nylon-6,6.

9. The method of claim 1, wherein the nylon fibers are nylon-6.

10. The method of claim 1, wherein dyeing composition has a liquor ratio ranging from 1:1 to 25:1 of dyeing composition to nylon fibers.

11. The method of claim 1, wherein 30-85 percent of the vat dye is exhausted onto the nylon fibers.

12. The method of claim 1, wherein the nylon fibers form a tufted pile.

13. The method of claim 1, wherein the nylon fibers form a loop pile.

14. The method of claim 1, wherein the vat dye is selected from the group consisting of Vat Yellow 33, Vat Blue 6, Vat Black 22, Vat Black 25, Vat Black 27, Vat Brown 1 and Vat Brown 3.

15. The method of claim 1 further comprising rinsing the fibers contacted with the dyeing composition with an acid solution.

* * * * *